July 2, 1968  E. J. SILK ETAL  3,390,448
METHOD OF MAKING NUCLEAR REACTOR FUEL ELEMENT ASSEMBLY
Filed July 24, 1964

INVENTORS
Nicholas C. Jessen
Edmond J. Silk
BY
ATTORNEY

United States Patent Office 3,390,448
Patented July 2, 1968

3,390,448
METHOD OF MAKING NUCLEAR REACTOR
FUEL ELEMENT ASSEMBLY
Edmond J. Silk and Nicholas C. Jessen, Lynchburg, Va.,
assignors to The Babcock & Wilcox Company, New
York, N.Y., a corporation of New Jersey
Filed July 24, 1964, Ser. No. 384,959
3 Claims. (Cl. 29—487)

This invention relates generally to the assembly of a nuclear fuel element and more particularly to an improved method for assembling and welding aluminum clad nuclear fuel elements having a plurality of longitudinally elongated plates assembled in parallel spaced relationship.

It has long been known that aluminum clad nuclear fuel elements possess desirable properties with regard to the heat transfer characteristics and the neutron economies possible. While many different fuel element assembly configurations have been conceived in the past, the basic types are now pin-type fuel elements and plate-type fuel elements. It is to this latter class of fuel element that the present invention is directed.

Plate-type fuel elements have been assembled in various ways depending upon the service requirements and the material from which they were fabricated. Aluminum plate-type fuel elements have been fabricated by assembling the fuel bearing, aluminum clad plates in parallel face-to-face relationship, fitting these plates into side plates grooved to accept the edges of the fuel plates, and securing them therein by various methods including roll swaging and pinning. Some non-aluminum plate-type fuel elements have been assembled by welding as disclosed in Patent No. 3,115,447. However, it has been found that aluminum clad fuel elements could not be satisfactorily assembled by welding since the heat of the welding operation caused such warpage and distortion of the fuel plates that it was impossible to achieve the required dimensional tolerances. Even in non-aluminum welded fuel elements the tolerances achieved were lower than desired.

The assembly of aluminum clad fuel elements by roll swaging creates the problem that it is difficult to assure adequate quality control with respect to the joint between the fuel bearing plates and the side plates since it is difficult to non-destructively test the finished product. This is especially true when the fuel element cladding is of the stronger and harder aluminum alloys. Likewise, the assembly of fuel elements using pinned connections between the fuel bearing plates and the side plates does not permit the maintenance of the extremely close tolerances necessary and does not assure the requisite strength of the assembly.

Close dimensional tolerances mentioned are necessary to asure the safety and desired life-time characteristics of the fuel element as well as the desired heat transfer and pressure drop characteristics. In plate-type fuel elements coolant fluid is passed at a high flow rate through the spaces between adjacent parallel fuel plates. The spacing of the plates is usually so close and the rate of heat generation by the fuel plates so high that a large mass of coolant must be passed therethrough with the lowest possible pressure drop to remove the heat generated by the fuel plates and prevent their burnout. Advantageously, this must be accomplished with the lowest possible pressure drop and thus the least possible pumping power. When the spacing between adjacent fuel plates varies from the precise design spacing the resultant higher differential pressure drop between adjacent flow spaces and higher fuel plate operating temperature could collapse the fuel plates, shortening the life of the fuel element and causing extreme operating hazards. It will thus be appreciated that it is necessary to assure the desired dimensional tolerances of the fuel plates during fabrication so that during operation the flow passage dimensions may be maintained within extremely close limits.

It has been found that when attempting to weld aluminum clad fuel elements, the welding operation caused the fuel plates to distort so badly that even minimal tolerances could not be met. Utilizing mechanical assembly procedures the strength of the joint between the fuel plates and the side plates was less than that possible with a welded joint so that the mechanical connections had to be overdesigned, increasing the mass of metal in the fuel element as well as its cost. The added mass of metal in the fuel element, of course, was detrimental to efficient neutron utilization within a reactor.

Accordingly, the present invention discloses a method of welding plate-type fuel elements while preventing distortion of the fuel plates and achieving tolerances not heretofore thought possible. This method may even be utilized for the assembly of aluminum clad plate-type fuel elements with the same close tolerance, high quality results.

Accordingly, the present invention is directed to the method of manufacturing a plate-type fuel element comprising the steps of stacking fissionable material bearing fuel plates in substantially face-to-face alignment with each other, spacing the fuel plates from each other with spacer plates having smaller outside dimensions and having a predetermined thickness to form a composite stack, placing the composite stack between a pair of rigid members with the opposing faces of the rigid members being contiguous with the face of the outside fuel plates, applying a compressive force to the stack, disposing a molten metal to fuse with and join the edges of only the fuel plates, cooling the composite stack, and removing the compressive force, the rigid members, and the spacer plates.

Furthermore, the compressive force is applied to the composite stack substantially perpendicular to the face of the fuel plates and is sufficient to form a substantially solid rigid assembly throughout the welding process.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 1:
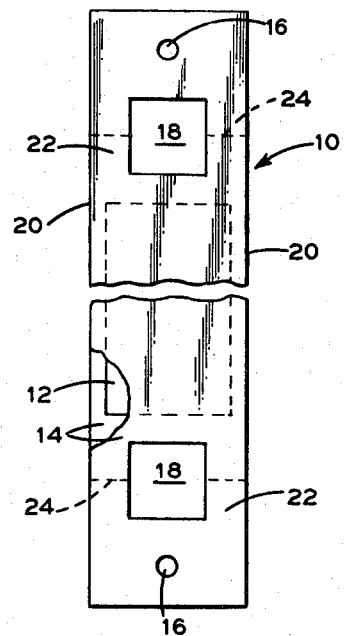
FIG. 1 is a plan view partially in section of an individual fuel plate of the present invention.
Figure 2:
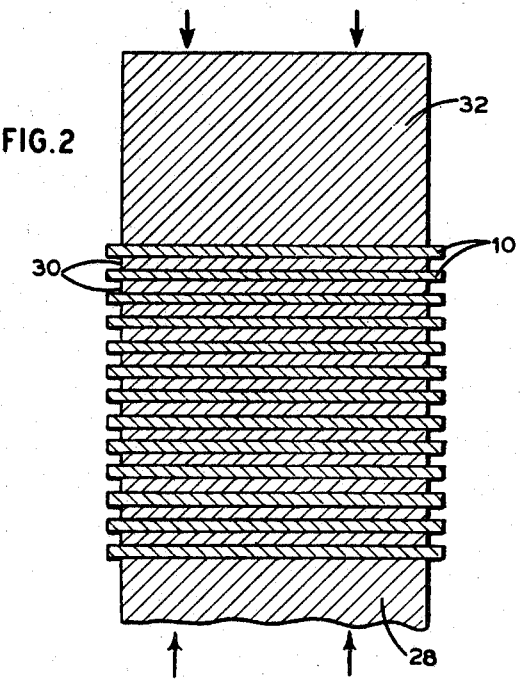
FIG. 2 is an end view of an assembly of fuel plates illustrated in FIG. 1 prior to joining the individual plates together.

FIG. 1 shows a plan view, partially in section, of a fuel bearing plate 10 having a relatively small thickness. Fuel plates of the type contemplated by the present invention are generally longitudinally elongated and comprise a nuclear fuel bearing insert 12 surrounded on all sides by cladding 14. The fuel plate illustrated is provided with both alignment holes 16 and cutout window sections 18, suitably positioned at both ends of the plate. The alignment holes 16 are used during the assembly of the fuel element to assure the necessary precise alignment of the fuel plates, which are subsequently joined along the longitudinal side edges 20 to form the fuel element. For example, the individual fuel plates may be stacked upon pins of a jig (not shown), with the pins extending through alignment holes 16. The windows 18 are utilized to provide extensions 22 beyond the plate portion containing the nuclear fuel insert 12. These may be connected to handling adapters (not shown) at both ends of the fuel element. In the fuel element illustrated, after the plates have been joined, they are cut along dotted lines 24 before the end adapters are connected thereto.

As previously noted, various methods of connecting the edges 20 of the fuel plates have been used, including swaging and pinning of the edges to separate or individual side plates extending perpendicular to the fuel plates. Also, as previously noted, it has been found that such mechanical assembly procedures have not provided the desired tolerances and mechanical strength in the completed fuel element. While non-aluminum fuel elements have been welded together it was previously though impossible to weld aluminum fuel elements due to the heat of the welding process which caused the individual fuel plates to twist and curl so that the necessary dimensional tolerances could not be met. While this problem of distortion is particularly prevalent with respect to aluminum fuel elements it may also complicate the fabrication of non-aluminum fuel elements. Thus the method of welding fuel elements here taught may also be applied, with the same benefits accuring, to the fabrication of non-aluminum fuel elements.

Figure 3:
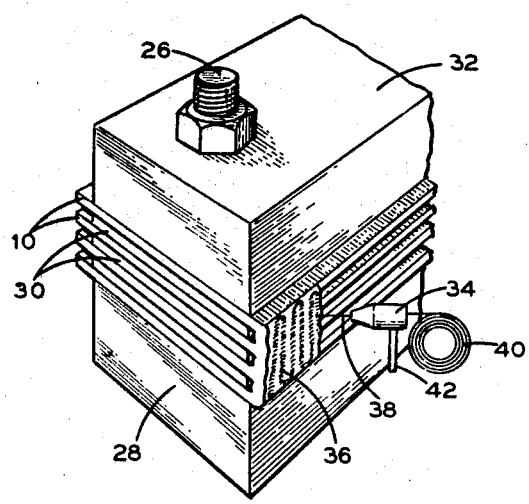
FIG. 3 is a perspective view of a smaller assembly than that shown in FIG. 2 during the welding together of the individual plates.

The method of fabricating the aluminum plate-type fuel elements involves the aligned stacking of the fissionable material bearing fuel plates 10 in substantially face-to-face alignment with each other. These fuel plates may be aligned on pins 26 extending from one face of a jig-block 28 (see FIG. 3). The adjacent fuel plates are spaced from each other by spacer plates 30 which are so dimensioned as to provide the desired final spacing between the adjacent fuel plates 10. These spacer plates may be formed of copper having a thickness exactly equal to the desired spacing between the fuel plates. The width of the spacing plates is such as to fall between the outer edges of the fissionable material insert 12 and the outer edges 20 of the plates. The length of the spacer plates is substantially the same as the length of the fuel plates. Thus a composite stack of alternating aluminum clad fuel plates and copper spacer plates is formed until the desired number of fuel plates is reached. As previously noted, this composite stack may be formed using the top surface of jig-block 28 as a base, aligning the plates with pin 26 which extends vertically upward from the top of the jig-block. The top of the jig-block 28 is contiguous with the corresponding face of the outside fuel plate. A second jig-block 32, the upper one in FIG. 3, is then placed contiguous with and resting on the uppermost fuel plate. The jig-blocks 28 and 32 have a length and width substantially equal to the spaced plates 30. However, the thickness of the jig-block is sufficient to provide a great enough mass to make the jib-blocks substantially rigid members, capable of resisting forces produced within the composite stack due to differential thermal expansion occasioned by welding of the fuel plates. After the top jig-block 32 is placed on the composite stack, a substantially perpendicular compressive force is applied to the faces of the plates. The imposed force, sufficient to produce a substantially unitary, rigid assembly, is maintained on the assembly during the welding process as with a threaded connection on the upper end of pins 26.

After the composite stack has been compressed, molten weld metal is deposited along the edges 20 of the fuel plates. For example, a welding means 34 may be reciprocably driven transversely of the edges 20 of the stacked fuel plates 10 while at the same time moved longitudinally relative thereto so as to produce overlapping cross welds as illustrated at 36, integrally joining the projecting edges of the plates together, forming a substantially integral solid assembly and assuring the integrity and strength of the joint. The depth of the weld penetration is so controlled as to prevent fusion of the weld metal with the spacer plates 30 and the inner surface of the weld is maintained approximately $\frac{1}{16}$ inch away from the edge of the spacer plate. When aluminum fuel plates are to be joined together by welding it has been found preferable to use a metallic inert gas procedure whereby an arc is formed between the end of a rod of weld filler material 38, i.e. an aluminum or aluminum alloy electrode well known in the art for fusion weding together aluminum or aluminum alloy materials, supplied from a source 40, and the edge of the fuel plates. The arc is shielded from the atmosphere by an inert gas supplied via line 42 in a manner well known in the art. It has been found that this type of welding procedure is preferable when welding aluminum since other inert gas welding processes have been found to produce undesirable porous weld characteristics.

During the welding process the fact that the aluminum clad fuel plates are precisely spaced by spacer plates having the exact thickness required fo rthe coolant flow channels in the finished fuel element, and the fact that the composite stack is maintained under a substantial compressive force between a pair of rigid blocks, prevents the fuel plates from distorting due to the heat of welding. Thus, when the welded fuel element has cooled and the jig-blocks and spacer plates have been removed, a finished fuel element is achieved with strength and tolerances not heretofore thought possible.

Figure 4:
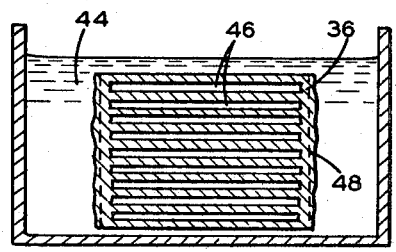
FIG. 4 is a sectional view of the semi-finished fuel element immersed in an acid bath.

After the composite stack is welded, and while the rigid jig-blocks are still in place compressing the composite stack, the entire assembly is annealed to assure dimensional stability after the jig-blocks are removed. After annealing, the jig-blocks 28 and 32 are removed from the composite stack and the stack is immersed in a pickling bath 44 which selectively dissolves the spacer plates 30 leaving the weld-assembled fuel element with accurately spaced flow passages 46 between adjacent fuel plates. A specific example of a pickling bath for use in removing copper spacer plates from an aluminum element utilizes nitric acid which selectively removes the copper without affecting the aluminum. If it is desired to increase the rate at which the copper spacer plates are removed, longitudinally spaced grooves are provided in the surface of the spacer plates which permit the acid to act along the entire plate length. After the spacer plates are removed from the assembly, the outer faces of the deposited weld metal 36 are machine finished to the final desired fuel element dimensions, as indicated by dotted lines 48 in FIG. 4.

Inasmuch as the fuel plates are secured in a rigid jig having spacer plates of predetermined thickness serving to form the coolant channel spaces, there is no possibility for the fuel plates to deform or warp. Thus the coolant flow channels may be precisely sized and the hydraulic forces acting on the fuel element reliably calculated. Furthermore, the heat generated in the assembly during the welding process tends to further increase the force acting on the fuel plates over the external force applied to the jig-blocks so as to assure even closer tolerances.

As specific example of a fuel element fabricated according to the method of the present invention is one in which the fuel element comprises 19 fissionable material bearing aluminum clad fuel plates having a thickness of 0.050 inch and a width of 2.98 inches. The length of the fuel element between end adapter assemblies is 49½ inches. The fuel bearing plates are assembled in face-to-face alignment with each other, with copper spacer plates 0.078 inch thick and 2.86 inches wide therebetween. The spacer plates have a length equal to that of the fuel plates. The composite stack of fuel plates and spacer plates are held between jig-blocks having approximately the same length and width as the spacer plates and having a thickness of approximately 4 inches. The assembly of the composite stack and the jig-blocks is then subjected to a pressure of 200 tons in a hydraulic press. The assembly is suitably clamped to maintain this pressure after the assembly is removed from the press. The side edges of the fuel plates are then joined by welding with a metal arc using argon shielding gas. The weld metal added during the welding process is substantially similar to the cladding in the fuel plates. The depth of weld penetration is controlled to prevent fusion of the weld metal with the spacer plates. After both sides of the fuel element are welded the entire assembly is annealed for a period of two hours at a temperature of 600° F. to assure the dimensional stability of the fuel element after removal from the jig-blocks. After annealing, the jig-blocks are removed and the composite stack is submerged in a nitric acid bath to chemically dissolve or remove the spacer plates. The outer surface of the deposited weld metal is then machined to the final desired dimensions. With previous manufacturing methods the coolant channel tolerances have been held to ±5 to 10 mils. Using the present method of fabricating fuel elements it has been possible to hold the coolant flow channel tolerance to ±1 mil. The particular environment of these fuel elements has been as follows:

| | | |
|---|---|---|
| Inlet temperature | ° F | 130 |
| Inlet pressure | p.s.i.g | 300 |
| Outlet temperature | ° F | 187 |
| Outlet pressure | p.s.i.g | 208 |
| Pressure drop | p.s.i | 92 |
| Coolant velocity | ft./sec | 44 |

With fuel elements fabricated by the present method, it has been found that dimensional tolerances have been so closely maintained and the resultant mechanical strength of the element so improved that the fuel element can be operated at a flow rate of 160% of that given above and with a pressure drop thereacross of 200% of that given above. It will thus be seen that the dimensional stability and the tolerences obtainable with the present method of fabricating aluminum elements greatly surpasses that previously thought possible.

While the present method has been described as being primarily directed to the fabrication of aluminum clad fuel elements, it should be appreciated that other types of fuel elements could also be fabricated by this method with the same advantages. Furthermore, while the fuel element illustrated incorporates flat fuel plates, curved or arcuate plate fuel elements could as readily be fabricated according to this method, utilizing jig-blocks conforming to the contour of the fuel plates. Likewise, while copper spacer plates have been disclosed they could just as easily be made of any other rigid material which is simply removed from the fuel plate cladding material.

A further modification of an assembly procedure according to the present invention utilizes fuel plates having the outside edges bent almost to a right angle from the main surface of the plate, with the amount of the edge being bent substantially equal to the spacing between adjacent fuel plates. In this manner the inner side walls of the coolant flow channels would be substantially smooth since the depth of weld metal penetration is limited to the outside surface of the bent leg of the fuel plate.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. The method of manufacturing a plate-type aluminum cladded fuel element comprising the steps of stacking longitudinally elongated fissionable-material bearing aluminum cladded fuel plates in substantial face-to-face alignment with each other, spacing said fuel plates from each other with spacer plates having smaller outside dimensions than said fuel plates and having a predetermined thickness to form a composite stack, placing said composite stack between a pair of rigid members with the opposing faces of said rigid members being contiguous with the face of the outside fuel plates, applying a substantially uniform compressive force to said stack substantially perpendicular to the faces of said plates, fusion weld depositing a molten metal to fuse with and join the longitudinal edges of only the aluminum cladding of said fuel plates, the fusion weld being made by fusion arc welding using an aluminum or aluminum alloy electrode while shielding the arc from the atmosphere with inert gas, cooling said composite stack, removing said compressive force, removing said rigid members, and removing said spacer plates.

2. The method of manufacturing a plate-type aluminum cladded fuel element comprising the steps of stacking longitudinally elongated fissionable-material bearing aluminum cladded fuel plates in substantial face-to-face alignment with each other, spacing said fuel plates from each other with spacer plates, having smaller outside dimensions than said fuel plates and having a predetermined thickness to form a composite stack, placing said composite stack between a pair of rigid members with the opposing faces of said rigid members being contiguous with the face of the outside fuel plates, applying a substantially uniform compressive force to said stack substantially perpendicular to the faces of said plates and sufficient to form a substantially solid rigid assembly, fusion weld depositing molten aluminum to fuse with and join the longitudinal edges of only the aluminum cladding of said fuel plates, the fusion weld being made by fusion arc welding using an aluminum or aluminum alloy electrode while shielding the arc from the atmosphere with inert gas, cooling said composite stack, removing said compressive force, removing said rigid members, removing said spacer plates, and finishing the outer face of said deposited metal.

3. The method of manufacturing a plate-type aluminum cladded fuel element comprising the steps of stacking longitudinally elongated fissionable-material bearing aluminum cladded fuel plates in substantial face-to-face alignment with each other, spacing said fuel plates from each other with spacer plates, having smaller outside dimensions than said fuel plates and having a predetermined thickness to form a composite stack, placing said composite stack between a pair of rigid members with the opposing faces of said rigid members being contiguous with the face of the outside fuel plates, applying a substantially uniform compressive force to said stack substantially perpendicular to the faces of said plates and sufficient to form a substantially solid rigid assembly, fusion weld depositing molten aluminum to fuse with and join the longitudinal edges of only the aluminum cladding of said fuel plates, the fusion weld being made by fusion arc welding using an aluminum or aluminum alloy electrode while shielding the arc from the atmosphere with inert gas, heat treating said composite stack, cooling said composite stack, removing said compressive force, removing said rigid members, removing said spacer plates, and finishing the outer face of said deposited metal.

References Cited

UNITED STATES PATENTS

| | | | |
|---|---|---|---|
| 2,985,571 | 5/1961 | Binstock | 29—475 |
| 1,828,977 | 10/1931 | Miller | 29—487 |
| 2,947,678 | 8/1960 | Gimera et al. | 176—75 |
| 3,020,222 | 2/1961 | Zambrow et al. | 176—75 |
| 3,028,326 | 4/1962 | Brand et al. | 176—75 |
| 3,115,447 | 12/1963 | Stengel | 176—75 |

(Other references on following page)

UNITED STATES PATENTS

| | | | |
|---|---|---|---|
| 3,152,049 | 10/1964 | Weisner | 176—75 X |
| 3,173,843 | 3/1965 | Simpson | 176—75 X |
| 3,217,132 | 11/1965 | Schillinger | 29—487 X |

OTHER REFERENCES

Cunningham and Boyle: MTR-Type Fuel Elements, Proceedings of the International Conference on the Peaceful Uses of Atomic Energy (8/55), vol. 9, 1956 pub., pp. 203–207, United Nations.

Weinberg, Cole and Mann: The Materials Testing Reactor and Related Research Reactors, Proceedings of the International Conference on the Peaceful Uses of Atomic Energy (1955), vol. 11, published by United Nations, pp. 402–419.

Proceedings of Second United Nations International Conference on the Peaceful Uses of Atomic Energy, vol. 6, pp. 398–399, September 1958.

JOHN F. CAMPBELL, *Primary Examiner.*

REUBEN EPSTEIN, *Examiner.*

H. BEHREND, R. F. DROPKIN, *Assistant Examiners.*